Figure 2:
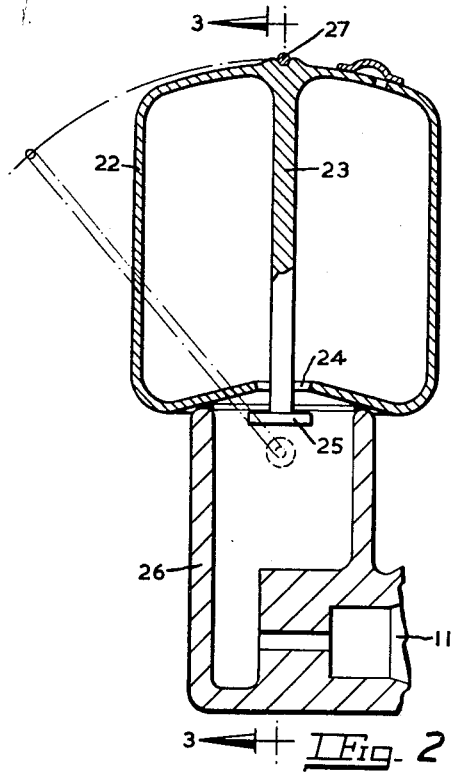

Oct. 23, 1962  L. W. KINGS  3,059,671
DEVICE FOR REPLENISHING FLUID IN A HYDRAULIC SYSTEM
Filed Jan. 5, 1960  2 Sheets-Sheet 1

Inventor
Leonard William Kings
By: Scrivener and Parker
Attys.

Oct. 23, 1962   L. W. KINGS   3,059,671
DEVICE FOR REPLENISHING FLUID IN A HYDRAULIC SYSTEM
Filed Jan. 5, 1960   2 Sheets-Sheet 2
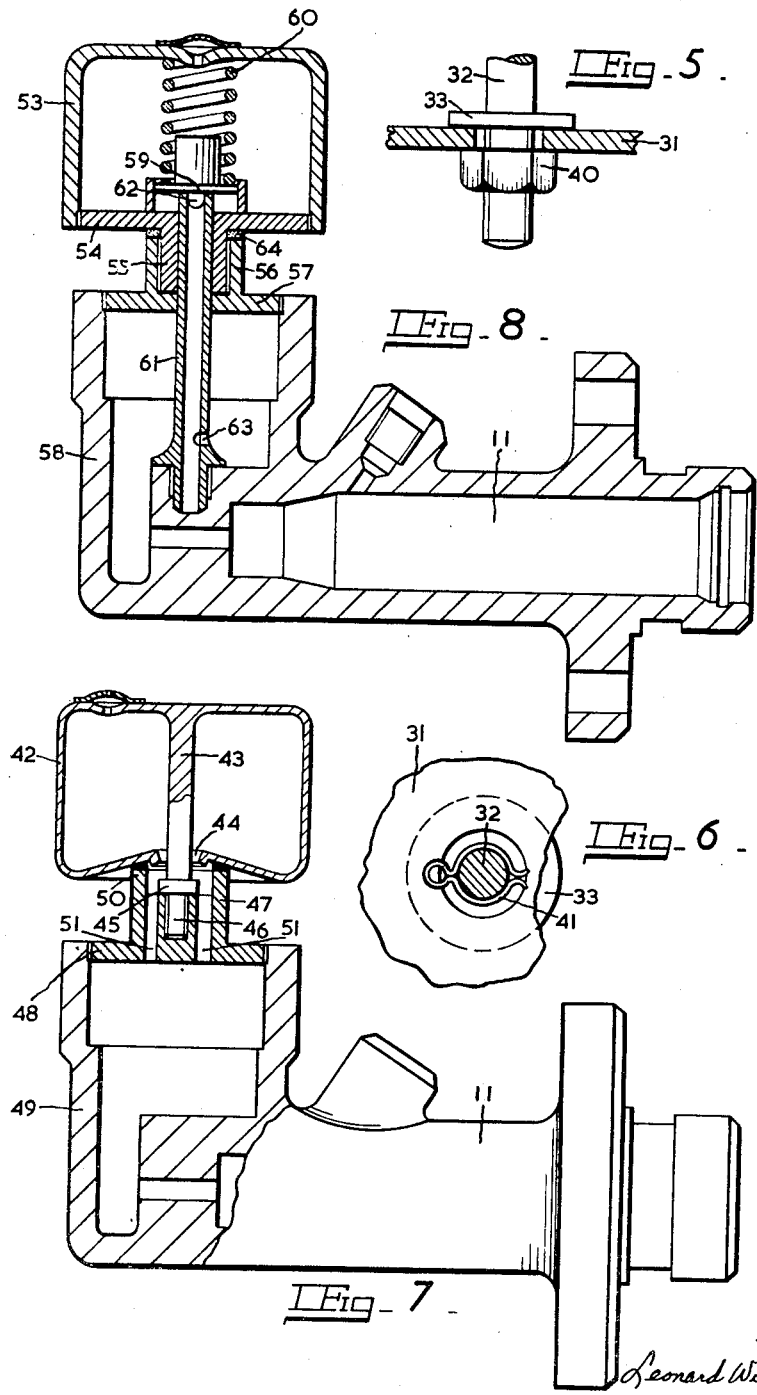
Inventor
Leonard William Kings
By: Scrivener and Parker
Attys.

3,059,671
Patented Oct. 23, 1962

3,059,671
DEVICE FOR REPLENISHING FLUID IN A HYDRAULIC SYSTEM
Leonard William Kings, Leamington Spa, England, assignor to Girling Limited, Birmingham, England, a British company
Filed Jan. 5, 1960, Ser. No. 555
Claims priority, application Great Britain Jan. 6, 1959
1 Claim. (Cl. 141—330)

This invention relates to improvements in hydraulic braking and other systems and is concerned particularly with the replenishment of such systems with fluid.

The usual practice is to provide a fluid reservoir which is connected into the system at a convenient point and from which liquid flows or is drawn into the system when the system is not under pressure or is under negative pressure to compensate for any leakage and to keep the system completely full of fluid.

The reservoir is usually connected to the master cylinder by which pressure is generated in the system, the connection being through a valve or through a port which is uncovered when the piston of the master cylinder is fully retracted, and in modern braking systems the reservoir is frequently combined with the master cylinder as a unit. The reservoir has to be replenished from time to time, and for this purpose it is usually provided with a filling orifice closed by a removable screwed cap. Replenishment may be difficult unless the reservoir is located in a reasonably accessible position, with the result that checking of the fluid level in the reservoir is often neglected and when the reservoir is replenished, grit and other foreign matter may be allowed to enter the system.

According to my invention, means for replenishing an hydraulic braking or other system comprises a closed container for fluid adapted to be attached to a portion of the system in sealing engagement therewith in combination with means for establishing communication between the interior of the container and the system when the container is in position or while it is being placed in position.

The placing of the container in position on a portion of the system may be arranged to cause it to engage a seating or other means for effecting a seal between the container and the system and at the same time to cause the container to be pierced, a movable closure to be displaced, or a valve to be opened so that fluid from the container can flow into the system.

When the fluid in the container has been used up, the container is simply detached from the system and thrown away and a fresh one substituted. Replenishment is thus extremely simple, and as the container is sealed until it has been attached to a portion of the system, in sealing engagement therewith, there is no risk of any foreign matter entering the system.

The container may be made of thin sheet metal or of any other convenient material, but preferably it is made of transparent plastic so that the volume of liquid remaining in it at any time can be seen at a glance.

The container may comprise the whole or the upper part only of a reservoir for fluid forming a part of the hydraulic system.

Figure 3:
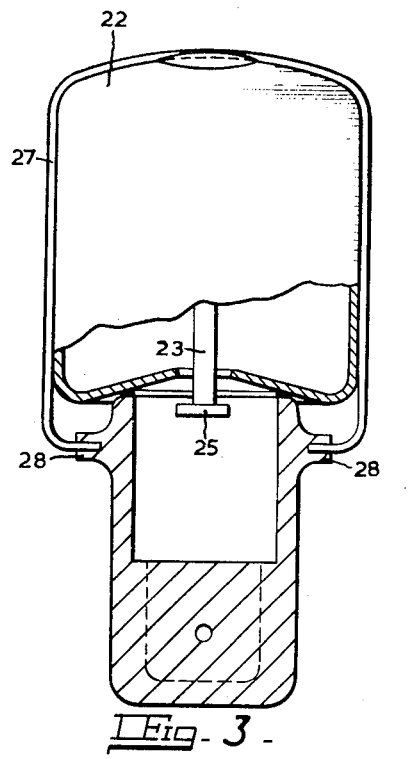
Figure 1:
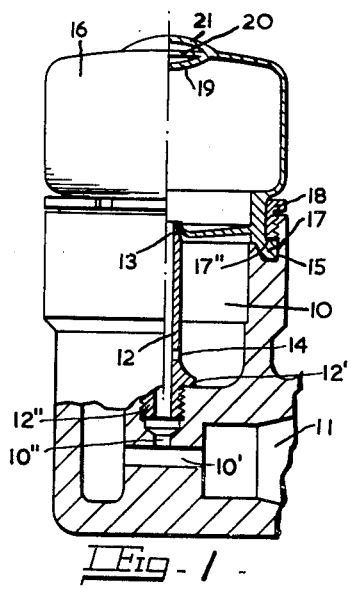
Figure 4:
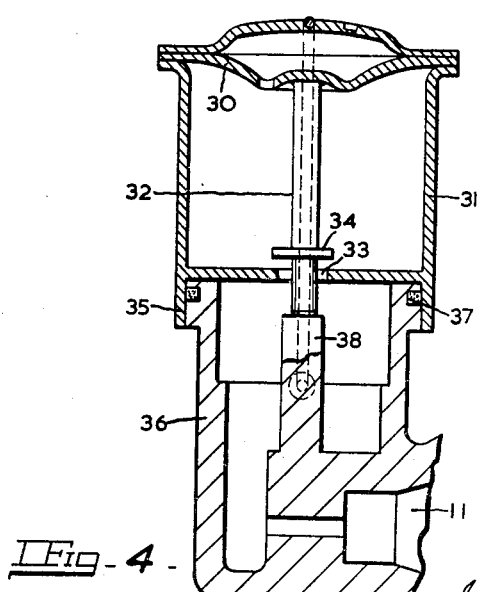

Some practical embodiments of my invention are illustrated by way of example in the accompanying drawings in which:

FIGURE 1 is an elevation in part section of a replenishment container fitted to a fluid reservoir integral with the master cylinder of an hydraulic braking system, FIGURE 2 is a vertical section of an alternative construction, FIGURE 3 is a vertical section on the line 3—3 of FIGURE 2, FIGURE 4 is a vertical section of another construction, FIGURES 5 and 6 are fragmentary sections showing means for sealing the container shown in FIGURE 5 before it is fitted, FIGURE 7 is an elevation in part section of yet another construction, FIGURE 8 is a section of a still further embodiment incorporating a valve.

In the construction shown in FIGURE 1, a fluid reservoir 10 comprises a cylindrical chamber open at its upper end and integral with a master cylinder 11 forming part of an hydraulic braking system, the reservoir being in communication with the master cylinder by way of a passage 10' in the base of the reservoir, the passage opening at one end into the reservoir and at the other end into the master cylinder.

A tube 12 has adjacent to its lower end an annular shoulder 12' below which is a screw-threaded spigot 12" which is screwed into a central recess in the bottom of the chamber 10, the recess being in communication with the passage 10' by way of a passage 10". The tube 12 extends upwardly in the centre of the chamber 10 to about the level of the upper end thereof, and the upper end of the tube is chamfered off to a knife edge 13. Ports 14 in the wall of the tube allow fluid to pass between the tube and the reservoir.

The peripheral wall of the chamber 10 at its upper end is counter-bored for a short distance and is internally screw-threaded. An annular recess 15 is formed in the shoulder at the bottom of the counter-bore.

The fluid container or capsule 16 is moulded in transparent plastic and has the form of a short closed cylinder of substantially the same diameter as the outside of the chamber 10. The lower end of the container is reduced in diameter to enter the upper end of the chamber. An annular flange 17 extends downwardly from the bottom end of the container and has at its lower end a radially projecting shoulder or step 17" of such dimensions as to fit snugly into the recess 15 at the upper end of the chamber 10 in which it is clamped in fluid-tight engagement with the chamber by a clamping ring 18 which is screwed into the upper end of the chamber and bears on the shoulder 17".

As the ring is screwed down, the centre of the bottom of the container is forced against the sharp upper end of the tube 12 which pierces it and establishes communication between the interior of the container and the reservoir and master cylinder by way of the tube 12.

A portion of the top of the container is formed as a dome incorporating three spaced layers or skins of material 19, 20, 21. Holes are formed in the two inner layers 19 and 20 in the making of the container, and after the container has been fitted to the reservoir, a small hole is pierced in the outer layer 21 to allow air to enter the container and maintain it at atmospheric pressure as fluid passes out of it.

It may be unnecessary to vent the container if it is made of flexible material which will allow the container to collapse as fluid is taken from it. In that case the material of the container may be opaque, the emptying of the container being indicated by its collapse.

In the construction shown in FIGURES 2 and 3 the container 22 is moulded with a central stem 23 which extends downwardly from the upper end of the container and through a central opening 24 in the bottom. The lower end of the stem has a flat head 25 with which the bottom is initially held in sealing engagement by the resilience of the material of the container.

To fit the container to a reservoir 26 having an open upper end of less diameter than the container, the container is pressed downwardly against the reservoir so that the bottom around the opening is pressed upwardly away from the head 25 and fluid can flow from the container into the reservoir. The container is held in this position in sealing engagement with the reservoir by a resilient wire loop or bail 27 pivoted in lugs 28 on the reservoir and engaging over the top of the container which has a transverse groove to receive and locate the wire.

In the construction shown in FIGURE 4, a resilient diaphragm 30 in the upper end of a container 31 carries a downwardly extending central stem 32 which passes through an opening 33 in the centre of the bottom. A radial collar or flange 34 on the stem is initially urged by the resilience of the diaphragm 30 into engagement with the bottom of the container to close the opening 33.

The container has a depending cylindrical skirt 35 which is a push-on fit on to the upper end of the reservoir 36. A seal 37 may be located in an annular groove in the wall of the reservoir.

When the container is applied to the reservoir and pushed down into position, an upstanding central abutment 38 in the reservoir engages the lower end of the stem and moves the stem upwardly so that the collar 34 is moved clear of the opening 33 and fluid can pass from the container into the reservoir. The container is held in position on the reservoir by a resilient wire loop or bail 39 in the same way as described above, with reference to the construction shown in FIGURES 2 and 3.

To ensure that the collar 34 is held in sealing engagement with the bottom of the container until the container is to be put into use, the lower end of the stem 32 below the collar may be screw-threaded to receive a nut 40 between which and the collar 34 the bottom of the container is clamped as shown in FIGURE 5. Alternatively, a removable spring clip 41 may be fitted to the stem below the bottom of the container as shown in FIGURE 6.

In the construction shown in FIGURE 7, the upper end of the container 42 carries a depending central stem 43 which extends downwardly through an opening 44 in the bottom of the container and carries a head 45 which initially closes the opening. The stem has below the head a spigot extension 46 which is screw-threaded and is adapted to be screwed into a central recess in an upstanding boss 47 on a closure 48 screwed into the upper end of the reservoir 49. When the container is applied to the reservoir and the spigot 46 is screwed into the boss 47, the peripheral portion 50 of the upper end of the boss engages and forces upwardly the bottom of the container around the opening 44 so that fluid can pass from the container through longitudinal passages 51 in the boss 47 into the reservoir.

In the construction shown in FIGURE 8, the container 53 is closed at the bottom by a disc 54 having a depending spigot portion 55 adapted to be screwed into a sleeve 56 extending upwardly from a closure 57, and initially the upper end of the passage through the spigot 55 is closed by a valve head 59 which is urged downwardly against the disc 54 by a spring 60. An upstanding hollow central stem 61 is located in the reservoir 58, and when the container is fitted to the reservoir by screwing the spigot 55 into the sleeve 56, the stem 61 extends through the axial passage in the spigot 55 and closure 57 and engages the valve head and moves it clear of the bottom of the container. Fluid can then pass from the container into the reservoir through the hollow stem 61 by way of notches 62 in the upper end of the stem and ports 63 in the wall of the stem within the reservoir. A compressible washer 64 is located between the bottom 54 of the container and the upper end of the sleeve 56 to make a seal.

I claim:

Means for replenishing the fluid in a hydraulic system comprising a reservoir having an open cylindrical upper end, an annular shoulder in said upper end spaced below the top thereof, said upper end between the top thereof and said shoulder being internally threaded, an annular recess in said shoulder, a sealed container having a stepped annular flange on the lower end thereof engaged in the annular recess in said shoulder, a clamping ring screwed into said open end and clamping said flange in sealing engagement with said recess, an upstanding hollow tube in said reservoir, a screw-threaded spigot on the lower end of said tube, a shoulder about the upper end of said spigot abutting the lower surface of said reservoir, a port in the bottom of said recess communicating with said hydraulic system, ports in said tube connecting the interior of the tube to the reservoir, and a chamfered knife edge at the upper end of said tube adapted to be engaged by and pierce the bottom of said container when the latter is fitted to said reservoir so as to establish sealed communication between said container and said reservoir through said tube.

References Cited in the file of this patent

UNITED STATES PATENTS

| | | |
|---|---|---|
| 1,248,705 | Pogue | Dec. 4, 1917 |
| 2,528,530 | Machleder | Nov. 7, 1950 |
| 2,746,253 | Anderson et al. | May 22, 1956 |

FOREIGN PATENTS

| | | |
|---|---|---|
| 773,063 | Great Britain | Apr. 17, 1957 |